United States Patent [19]
Schmidt

[11] Patent Number: 5,529,440
[45] Date of Patent: Jun. 25, 1996

[54] CUT-OFF AND SLOTTING INSERT HAVING CUTTING EDGES ON FOUR SYMMETRICAL CORNERS

[75] Inventor: Reinar Schmidt, Insjön, Sweden

[73] Assignee: Nya Scandinavian Tool Systems AB, Insjon, Sweden

[21] Appl. No.: 150,178

[22] PCT Filed: May 26, 1992

[86] PCT No.: PCT/SE92/00357

§ 371 Date: Jun. 27, 1994

§ 102(e) Date: Jun. 27, 1994

[87] PCT Pub. No.: WO92/21465

PCT Pub. Date: Dec. 10, 1992

[30] Foreign Application Priority Data

May 31, 1991 [SE] Sweden .................................. 9101668

[51] Int. Cl.⁶ .......................... B23B 27/06; B23B 27/04
[52] U.S. Cl. ............................... 407/113; 407/117
[58] Field of Search ............................... 407/42, 61, 103, 407/113, 114, 115, 116, 117

[56] References Cited

U.S. PATENT DOCUMENTS

| 4,074,949 | 2/1978 | Hochmuth et al. | 407/114 |
| 4,632,607 | 12/1986 | Pantzaz | 407/113 |
| 4,669,925 | 6/1987 | Lowe et al. | 407/114 |
| 4,963,061 | 10/1990 | Katbi et al. | 407/114 |

FOREIGN PATENT DOCUMENTS

| 90/14930 | 12/1990 | WIPO | 407/113 |

*Primary Examiner*—Daniel W. Howell
*Assistant Examiner*—Kenneth J. Hansen
*Attorney, Agent, or Firm*—Hodgson, Russ, Andrews, Woods & Goodyear

[57] ABSTRACT

In order to improve cutting insert economy with simplified manufacture, an exchangeable insert (1) is configured generally symmetrical in the form of a four-cornered plate with four cutting edges (4) in the corners respectively and with plane-parallel abutment surfaces (5) disposed between the cutting edge portions and at right angles to each other. All of the cutting edge portions are mutually identical to each other, and each cutting edge portion is symmetrically formed about a bisector which passes through a circular center hole in the insert. This is provided in order to achieve a high degree of accuracy with respect to position and direction when attaching the cutting insert to the holder (3). Manufacture of the cutting insert is simplified considerably by gathering several insert blanks into a pack and first grinding the blanks simultaneously to their correct external shape and then fitting each insert-blank in a fixture in a diamond pattern, in which the edges of each insert-blank can be ground individually to its intended form.

8 Claims, 2 Drawing Sheets

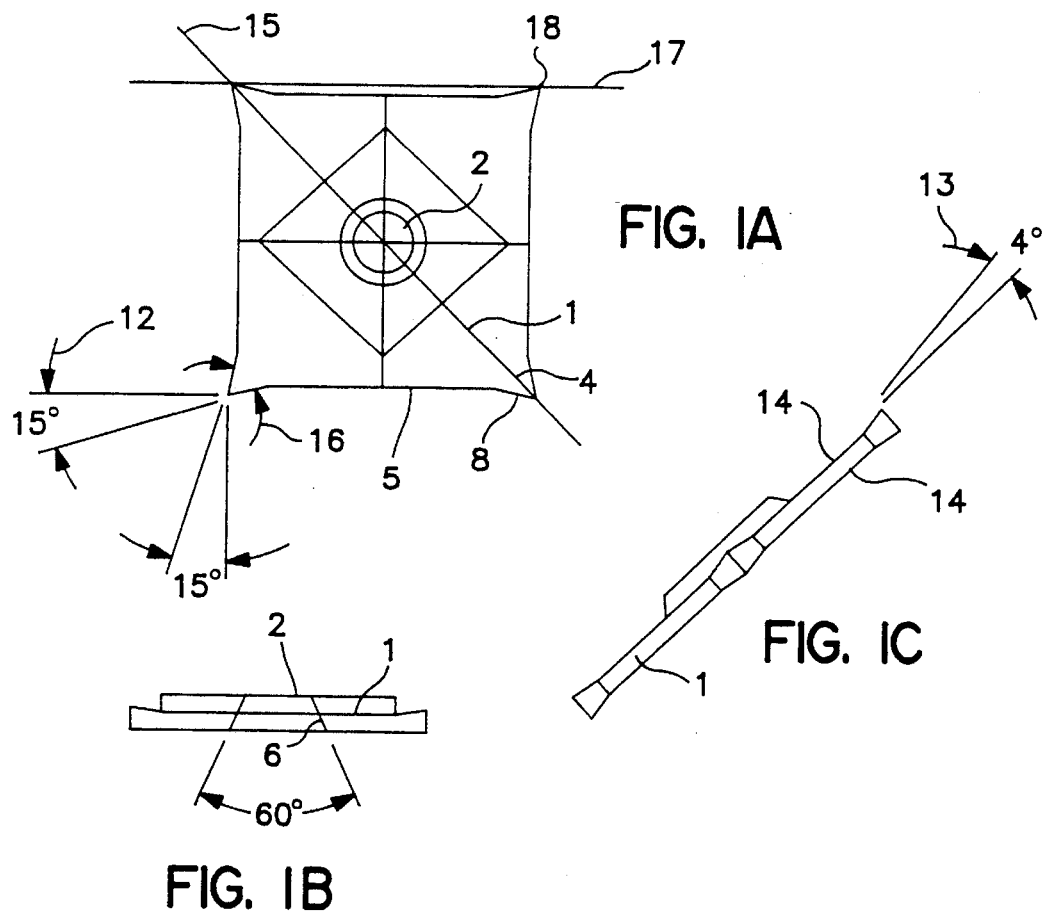
FIG. 1A
FIG. 1B
FIG. 1C
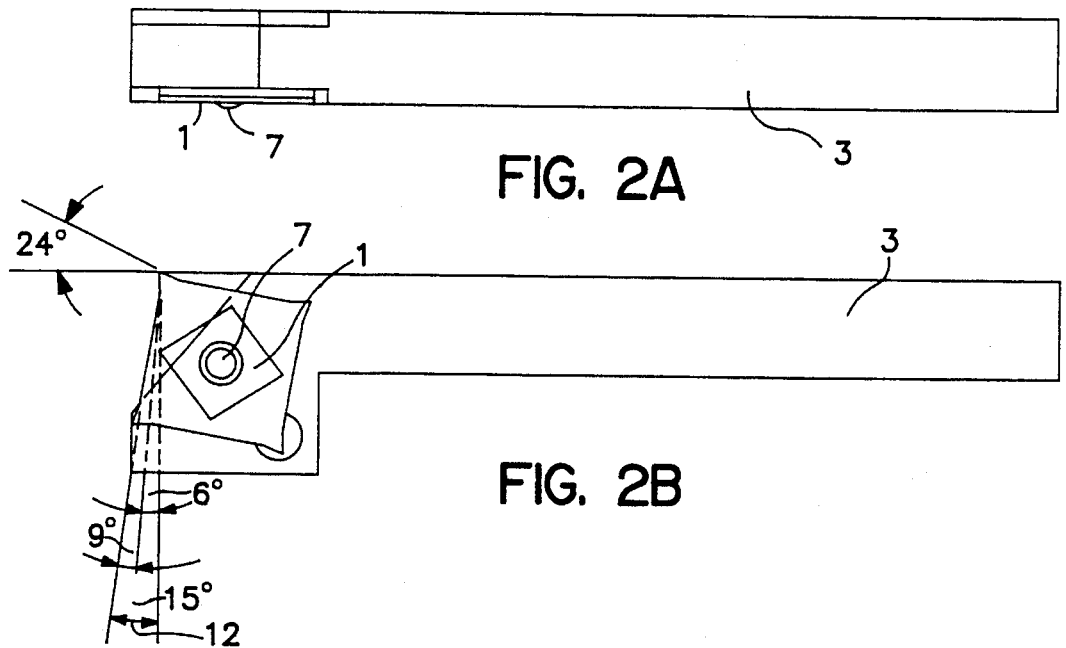
FIG. 2A
FIG. 2B

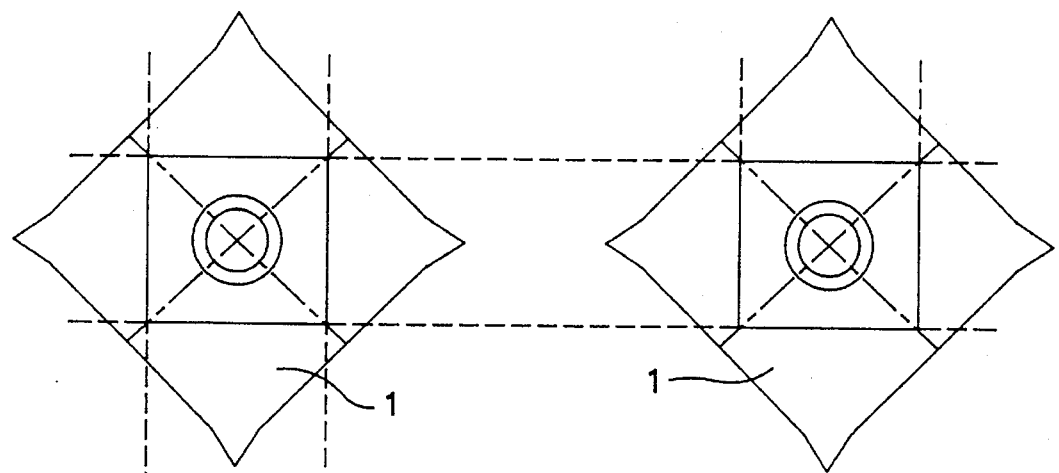
FIG. 3A
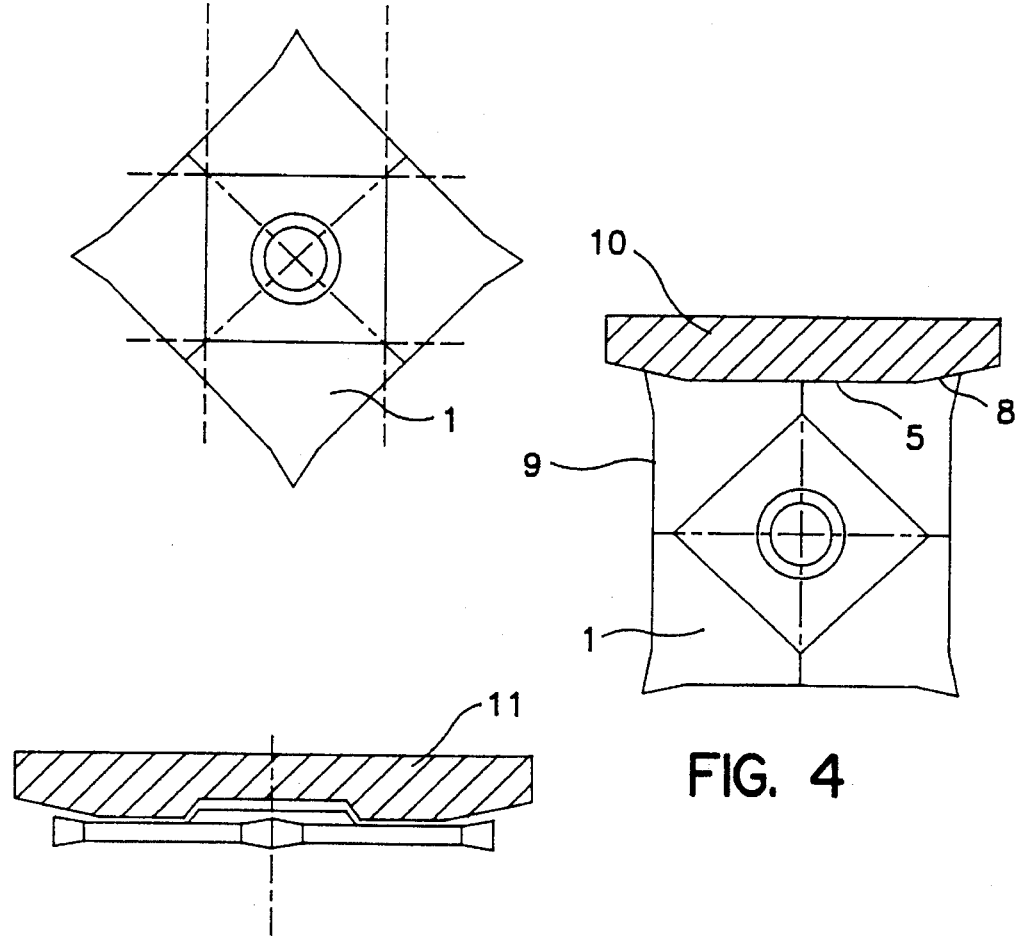
FIG. 3B
FIG. 4

CUT-OFF AND SLOTTING INSERT HAVING CUTTING EDGES ON FOUR SYMMETRICAL CORNERS

The present invention relates to an exchangeable cutting insert and also to an insert holder, for slotting and parting-off a workpiece, for instance for parting-off a workpiece with the aid of automatically controlled workpiece processing machine.

TECHNICAL FIELD

A workpiece can be slotted and parted-off in various ways, for instance either plastically or mechanically with the aid of cutting inserts. Parting-off is achieved by cutting material from a rotating workpiece with the aid of a cutting insert, such as an appropriate indexable insert clamped in a holder intended therefor. Products can be produced quickly d efficiently in modern day NC and CNC lathes/machining appliances fitted with cutting inserts and insert, holders. Parting-off of a workpiece is effected in a manner corresponding to a normal lathe turning operation, in which the cutting bit, or lathe tool, is fed inwards after each revolution of the work-piece through a distance which is equal to the thickness of the chip or swarf removed. The cutting tip of an indexable insert is normally ground to the width that is corresponded, for instance, between two flanks.

Exchangeable bits or cutting inserts for slotting and parting-off workpieces have been available commercially since the beginning of the 1960's. There have been used mostly three-edged inserts which have been secured in an upstanding position in an insert-attachment provided in a holder therefor. In conjunction with the development of machining apparatus and appliances, it has been necessary to incorporate greater safety measures against the breakage or fracture of cutting inserts in the performance of their work, particularly in the case of unmanned, continuously working machines. Because of the high investment costs involved with large machines of this kind, necessary at present time, the economics of such cutting inserts, or bits, have become increasingly important to the companies concerned.

SUMMARY OF THE INVENTION

With the intention of improving cutting insert economy in conjunction with simplified manufacture, the inventive exchangeable insert has been configured generally symmetrical in the form of a four-cornered plate with four cutting edges in each corner and with plane-parallel abutment surfaces on each edge-side. These abutment surfaces are disposed between the cutting edges perpendicularly to one another, which results in a high degree of accuracy with respect to position and direction when attaching the cutting insert to the holder. The shape of the cutting insert allows it to be reversed and indexed, and allows narrow tolerances to be used. Manufacture of the cutting insert can be simplified considerably, by gathering several insert blanks together to form a pack and first grinding the blanks, all at once, to their correct intended external shape and then fitting each insert-blank in a fixture in a diamond configuration, in which the edges of each insert-blank can ground to its intended form. Because the cutting insert is placed on one edge, the insert will have a high mechanical strength. The cutting forces will act on the corners of the cutting insert within a large angular range and will be taken-up essentially by the whole of the insert, thereby greatly reducing the risk of the insert fracturing. One and the same cutting insert can be used both for right-hand and left-hand use.

BRIEF DESCRIPTION OF THE DRAWINGS

FIGS. 1A, B, and C respectively illustrate an inventive cutting insert from above, from one side and at right angles to a diagonal.

FIGS. 2A, B show the insert fitted to an insert holder.

FIG. 3A shows the insert fitted to a grinding fixture.

FIG. 3B is a side view of a ground profile for an insert fitted to a fixture.

FIG. 4 shows one end of an insert bundle and a ground profile.

DESCRIPTION OF A PREFERRED EMBODIMENT

FIG. 1 illustrates a possible configuration of an exchangeable cutting insert 1 made of HSS or cemented carbide for slotting or parting-off a workpiece, in accordance with the invention. The insert 1 is of the indexable kind and is essentially square in shape, with centrally positioned hole 2 by means of which the insert 1 can be fitted to an insert holder 3 (see FIG. 2). Each corner of the insert 1 is provided with an outwardly protruding and bevelled cutting edge portion 4 having an edge 18. Mutually opposing side edges 5 of the insert 1 are disposed in pairs, parallel with one another. The cutting edges 4 extend outwards from the center. The pairs of mutually opposite abutment surfaces 5 are used as abutment surfaces when fitting the insert 1 to the holder 3 and are mutually perpendicular to one another, therewith assisting in accurate positioning of the insert 1 in the holder 3, said holder having corresponding mutually perpendicular surfaces with intermediate spacing for accommodating a cutting edge 4 on one or both sides. The attachment hole 2 may be bevelled or chamfered, as at 6, on one or both sides thereof, which together with an appropriate attachment device 7 assists in providing firm fixture of the insert 1 to the holder 3 and also enables the insert to be indexed and re-fixed to the holder, when necessary. The insert is provided forwardly of each cutting edge portion 4 with a chip-breaker or chip-leader 8, for instance a narrowing bevel on each of the respective side edges 5 forming an angle, illustrated at 12, of about 15° relative to the respective side edge 5. The insert 1 is held in the holder in an upstanding position and inclined at an angle of about 9°, with the aid of an appropriate fastener. There is obtained with this type of cutting insert and the manner in which it is held in the holder 3 a favourable distribution of cutting forces throughout the insert, said forces acting essentially in the plane of the insert, towards its center, therewith reducing the risk of insert fracture. Together with the cutting edges of the insert, the corners of the insert take up a large angular range which also results in favourable distribution of the cutting force acting on the insert and also in favourable heat distribution in the cutting edge portions.

FIG. 4 is an end view of a bundle or pack 9 of cutting inserts and illustrates a conceivable corresponding profiled grinding tool 10. This grinding tool can be passed backwards and forwards over the pack in a manner to produce planar abutment surfaces 5 and bevelled cutting edges 4, 8. The corners of the insert are bevelled, in order to provide good cutting properties, for instances when machining workpieces of small diameters, and also to provide an efficient chip-breaking/chip-leading effect.

FIGS. 3A and 3B illustrate several cutting inserts taken from a ground pack of insert fitted to a fixture at equally large center distances. In this case, a second grinding tool 11 can be passed backwards and forwards over several inserts disposed diagonally and in line with one another, so as to produce the desired profile on the planar cutting surfaces, thereby minimizing the number total number of grinding operations required. A widening bevel on each of the planar sides 14 forming an angle, illustrated at 13, of about 4° relative to the respective planar side 14 will provide the cutting edges with good cutting properties.

Because the square located area inwardly of ground regions of the insert is thicker than the remainder of the insert, compensation is obtained for the presence of the attachment hole and this thicker area will also afford good resistance to torque when the cutting insert is in use.

The number of grinding operations required to produce a cutting insert of the aforedescribed kind is greatly reduced by the present invention while, at the same time, there is obtained an indexable cutting insert which has four cutting edges, these features contributing towards achieving good insert economy, both with regard to insert manufacture and use of the insert.

All of the cutting edge portions 4 are mutually identical, and each cutting edge portion 4 is symmetrically formed about a bisector or bisecting line, illustrated at 15, which passes through the center of the insert 1 wherein the cutting insert 1 can be fitted alternatively to the right or to the left side of the holder 3 for right-hand or left-hand use. The insert is characterized in that each cutting edge portion 4 is shaped as a projection at the related corner of the insert 1 and forms an acute angle, illustrated at 16, at its edge, illustrated at 18, so that each abutment surface 5 is located inwardly offset from a line, illustrated at 17, connecting the cutting edges 18 at each end of the abutment surface 5. Angle 16 is preferably about 60°.

I claim:

1. An exchangeable, indexable generally four-sided slotting and parting-off cutting insert which has a pair of planar sides and four side edges and which has a cutting edge portion having a cutting edge provided at each corner thereof and which includes mutually parallel and mutually opposing planar abutment surfaces between the cutting edge portions and which further includes a circular center hole for fitting the insert to a holder in an upstanding position and for holding said insert in said holder characterized in that all of said cutting edge portions (4) are mutually identical, and each of said cutting edge portions is symmetrically formed about a bisector which passes through the center of the circular center hole and said respective cutting edge portion; and in that each cutting edge portion (4) has means defining a narrowing bevel adjacent the side edge, each bevel forming an acute angle relative to said respective side edge, and the planar sides forming a widening bevel at an acute angle relative to said respective planar side, wherein a thickness of the insert increases toward the abutment surfaces.

2. A slotting and parting-off insert according to claim 1, characterized in that said narrowing bevel angle (12) is about 15°.

3. A slotting and parting-off insert according to claim 1, characterized in that said widening bevel angle is about 4°.

4. An exchangeable, indexable generally four-sided slotting and parting-off cutting insert (1) which has a pair of planar sides and four side edges and which has a cutting edge portion (4) having a cutting edge (18) provided at each corner thereof and which includes mutually parallel and mutually opposing planar abutment surfaces (5) between the cutting edge portions (4) and which further includes a circular center hole (2) for fitting the insert to a holder (3) in an upstanding position and for holding said insert (1) in said holder (3) all of said cutting edge portions (4) being mutually identical, and each of said cutting edge portions (4) being symmetrically formed about a bisector (15) which passes through the center of the circular center hole (2) and said respective cutting edge portion and having means defining a widening bevel on the planar sides which forms an acute angle relative to said respective planar side; wherein a thickness of the insert increases toward the abutment surfaces, characterized in that each cutting edge portion (4) is shaped as a projection of the insert having a narrowing bevel (1) forming an acute angle (16) adjacent each cutting edge (18) so that each abutment surface (5) is located inwardly offset from a line (17) connecting the cutting edges (18) at each end of the abutment surface (5).

5. A slotting and parting-off insert according to claim 4, characterized in that said acute angle (16) is about 60°.

6. A slotting and parting-off insert according to claim 4, characterized in that said widening bevel angle is about 4°.

7. A slotting and parting-off insert according to claim 4, characterized in that the insert has means defining a narrowing bevel on the side edges which forms an angle (12) relative to said respective side edge.

8. An exchangeable, indexable generally four-sided slotting and parting-off cutting insert (1) which has a pair of planar sides and four side edges and which has a cutting edge portion (4) having a cutting edge (18) provided at each corner thereof and which includes mutually parallel and mutually opposing planar abutment surfaces (5) between the cutting edge portions (4) and which further includes a circular center hole (2) for fitting the insert to a holder (3) in an upstanding position and for holding said insert (1) in said holder (3); all of said cutting edge portions (4) being mutually identical, and each of said cutting edge portions (4) being symmetrically formed about a bisector (15) which passes through the center of the circular center hole (2) and said respective cutting edge portions and having means defining a widening bevel on the planar sides which forms an acute angle relative to said respective planar side wherein a thickness of the insert increases toward the abutment surfaces; characterized in that each cutting edge portion (4) is shaped as a projection of the insert (1) forming an acute angle (16) adjacent each cutting edge (18) so that each abutment surface (5) is located inwardly offset from a line (17) connecting the cutting edges (18) at each end of the abutment surface (5), the insert having means defining a narrowing bevel on the side edges which forms an angle (12) of about 15° relative to said respective side edge.

\* \* \* \* \*